(12) United States Patent
Kennedy, Sr.

(10) Patent No.: US 7,063,389 B2
(45) Date of Patent: Jun. 20, 2006

(54) SEAT BELT ASSEMBLY SYSTEM

(76) Inventor: Johnny R. Kennedy, Sr., 5136 JRK Dr., Durham, NC (US) 27705-8370

( * ) Notice: Subject to any disclaimer, the term of this patent is extended or adjusted under 35 U.S.C. 154(b) by 0 days.

(21) Appl. No.: 10/705,583

(22) Filed: Nov. 10, 2003

(65) Prior Publication Data

US 2005/0110328 A1    May 26, 2005

(51) Int. Cl.
*B60R 21/00* (2006.01)
(52) U.S. Cl. ..................... 297/483; 297/475
(58) Field of Classification Search .............. 297/483, 297/475, 473, 452.18; 280/807, 808, 801.1
See application file for complete search history.

(56) References Cited

U.S. PATENT DOCUMENTS

| | | | |
|---|---|---|---|
| 2,071,903 A | 2/1937 | Shively | 280/150 |
| 2,257,099 A | 9/1941 | Beirise | 242/107 |
| 2,468,560 A | 4/1949 | Kirkpatrick | 155/189 |
| 2,480,335 A | 4/1949 | Nordmark | 155/189 |
| 2,488,858 A | 11/1949 | Franz | 155/189 |
| 2,649,145 A | 8/1953 | McCarthy | 155/189 |
| 2,701,693 A | 2/1955 | Nordmark et al. | 242/107 |
| 2,725,097 A | 11/1955 | Thoreson | 155/189 |
| 2,798,539 A | 7/1957 | Johnsono | 155/189 |
| 2,814,504 A | 11/1957 | Campbell et al. | 280/150 |
| 2,819,095 A | 1/1958 | Haltmar, Jr. | 280/150 |
| 2,830,655 A | 4/1958 | Lalande | 155/189 |
| 2,937,882 A | 5/1960 | Oppenheim | 280/150 |
| 2,939,519 A | 6/1960 | McCall | 155/189 |
| 2,963,080 A | 12/1960 | Zang | 155/189 |
| 3,032,374 A | 5/1962 | Robinson et al. | 297/388 |
| 3,065,027 A | 11/1962 | Misslich et al. | 297/388 |
| 3,147,995 A | 9/1964 | Bohlin | 297/385 |
| 3,147,996 A | 9/1964 | Ferrara et al. | 297/388 |
| 3,184,267 A | 5/1965 | Rumble | 297/388 |
| 3,199,918 A | 8/1965 | Nakolan | 297/388 |
| 3,248,148 A | 4/1966 | Board et al. | 297/388 |
| 3,304,119 A | 2/1967 | Boedigheimer | 297/388 |
| 3,323,829 A | 6/1967 | Liem | 296/65 |
| 3,351,381 A | 11/1967 | Boblitz | 297/385 |
| 3,385,633 A | 5/1968 | Aizley | 297/389 |
| 3,418,007 A * | 12/1968 | Jantzen | 280/807 |
| 3,439,933 A | 4/1969 | Jantzen | 280/150 |
| 3,447,833 A | 6/1969 | Rice | 297/386 |
| 3,451,720 A * | 6/1969 | Makinen | 297/483 |
| 3,486,792 A | 12/1969 | Stoffel | 297/388 |
| 3,512,830 A | 5/1970 | Norman et al. | 297/250 |

(Continued)

*Primary Examiner*—Milton Nelson, Jr.
(74) *Attorney, Agent, or Firm*—Olive & Olive, P.A.; S. Matthew Edwards; B. B. Olive

(57) ABSTRACT

A seat belt system adapted for use with a seat-belt ready seat frame; comprising: (A) housing unit comprising: (i) enclosure and lid portions; (ii) seat belt retractor; (iii) retractor shoulder belt mounted on the retractor with webbing and a first connector; (iv) back cover portion, adapted to be fixedly attached to the seat frame and removably attached to the unit; and (v) the housing unit adapted to be fixedly attached to the underside of the seat frame; (B) multi-connecting lap and shoulder belt having a second section of seat belt webbing and connected at a distal end by way of a Y-junction to second and third connectors, wherein the second connector releasably interconnects with the first connector; and (C) single lap belt having a third section of seat belt and having at the opposite distal end a fourth connector, wherein the fourth connector releasably interconnects with the third connector.

31 Claims, 3 Drawing Sheets

U.S. PATENT DOCUMENTS

| | | | |
|---|---|---|---|
| 3,620,569 A | 11/1971 | Mathis | 297/388 |
| 3,637,258 A | 1/1972 | Bayon | 297/389 |
| 3,645,549 A | 2/1972 | Jantzen | 297/388 |
| 3,746,393 A | 7/1973 | Andres et al. | 297/385 |
| 3,806,195 A | 4/1974 | Frey | 297/385 |
| 3,915,495 A | 10/1975 | Oehm | 297/388 |
| 3,981,519 A | 9/1976 | Cataldo | 280/744 |
| 3,994,513 A | 11/1976 | Courtis et al. | 280/747 |
| 4,006,934 A | 2/1977 | Murakami et al. | 297/386 |
| 4,099,778 A | 7/1978 | Lehr | 297/386 |
| 4,109,962 A | 8/1978 | Magyar | 297/385 |
| 4,114,947 A | 9/1978 | Nelson | 297/344 |
| 4,205,670 A | 6/1980 | Owens | 128/134 |
| 4,238,135 A | 12/1980 | Sandham | 297/468 |
| 4,305,618 A | 12/1981 | Molnar | 297/476 |
| 4,314,715 A | 2/1982 | Duguet et al. | 280/801 |
| 4,585,273 A | 4/1986 | Higgs et al. | 297/452 |
| 4,632,425 A | 12/1986 | Barratt | 280/801 |
| 4,770,459 A | 9/1988 | Nakaiwa et al. | 296/65 R |
| 4,911,377 A | 3/1990 | Lortz et al. | 242/107.4 |
| 4,973,083 A | 11/1990 | Richards et al. | 280/801 |
| 5,031,961 A | 7/1991 | Isern | 297/473 |
| 5,147,110 A | 9/1992 | Syers | 297/397 |
| 5,246,271 A | 9/1993 | Boisset | 297/362.13 |
| 5,265,909 A | 11/1993 | Verbeski | 280/808 |
| 5,280,995 A * | 1/1994 | Elton | 297/238 |
| 5,308,148 A | 5/1994 | Peterson et al. | 297/468 |
| 5,382,083 A | 1/1995 | Fecteau et al. | 297/452.2 |
| 5,429,418 A | 7/1995 | Lipper et al. | 297/465 |
| 5,439,271 A | 8/1995 | Ryan | 297/452.56 |
| 5,555,458 A | 9/1996 | Large | 340/945 |
| 5,575,533 A | 11/1996 | Glance | 297/452.2 |
| 5,624,135 A | 4/1997 | Symonds | 280/801.1 |
| 5,697,670 A | 12/1997 | Husted et al. | 297/216.13 |
| 5,746,476 A | 5/1998 | Novak et al. | 297/216.13 |
| 5,782,537 A | 7/1998 | Leistra et al. | 297/473 |
| 5,853,193 A | 12/1998 | Marshall | 280/748 |
| 5,890,909 A | 4/1999 | Gladish | 434/305 |
| 6,048,034 A | 4/2000 | Aumont et al. | 297/478 |
| 6,053,580 A | 4/2000 | White, Sr. | 297/467 |
| 6,116,696 A | 9/2000 | Widman et al. | 297/483 |
| 6,123,388 A | 9/2000 | Vits et al. | 297/216.13 |
| 6,139,111 A | 10/2000 | Pywell et al. | 297/484 |
| 6,217,069 B1 | 4/2001 | Ganesan | 280/801.1 |
| 6,264,280 B1 | 7/2001 | Ohlund | 297/474 |
| 6,312,056 B1 | 11/2001 | Murphy et al. | 297/464 |
| 6,328,379 B1 | 12/2001 | Merrick et al. | 297/216.1 |
| 6,412,863 B1 | 7/2002 | Merrick et al. | 297/216.18 |
| 6,485,098 B1 | 11/2002 | Vits et al. | 297/216.13 |
| 6,508,515 B1 | 1/2003 | Vits et al. | 297/483 |
| 6,565,120 B1 | 5/2003 | Ganesan | 280/801.1 |
| 6,676,219 B1 * | 1/2004 | Brewer | 297/485 |
| 2001/0008337 A1 | 7/2001 | Ganesan | 280/801.1 |
| 2003/0025380 A1 | 2/2003 | Vits et al. | 297/483 |
| 2003/0034686 A1 | 2/2003 | Soderstrom et al. | 297/484 |
| 2003/0173817 A1 | 9/2003 | Vits et al. | 297/484 |

* cited by examiner

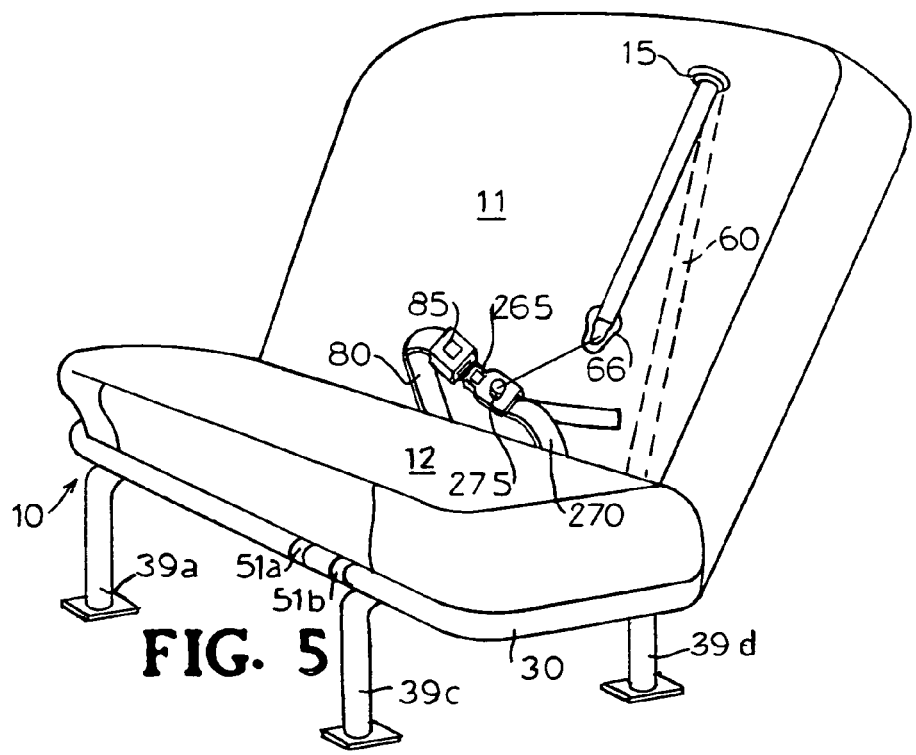
FIG. 5
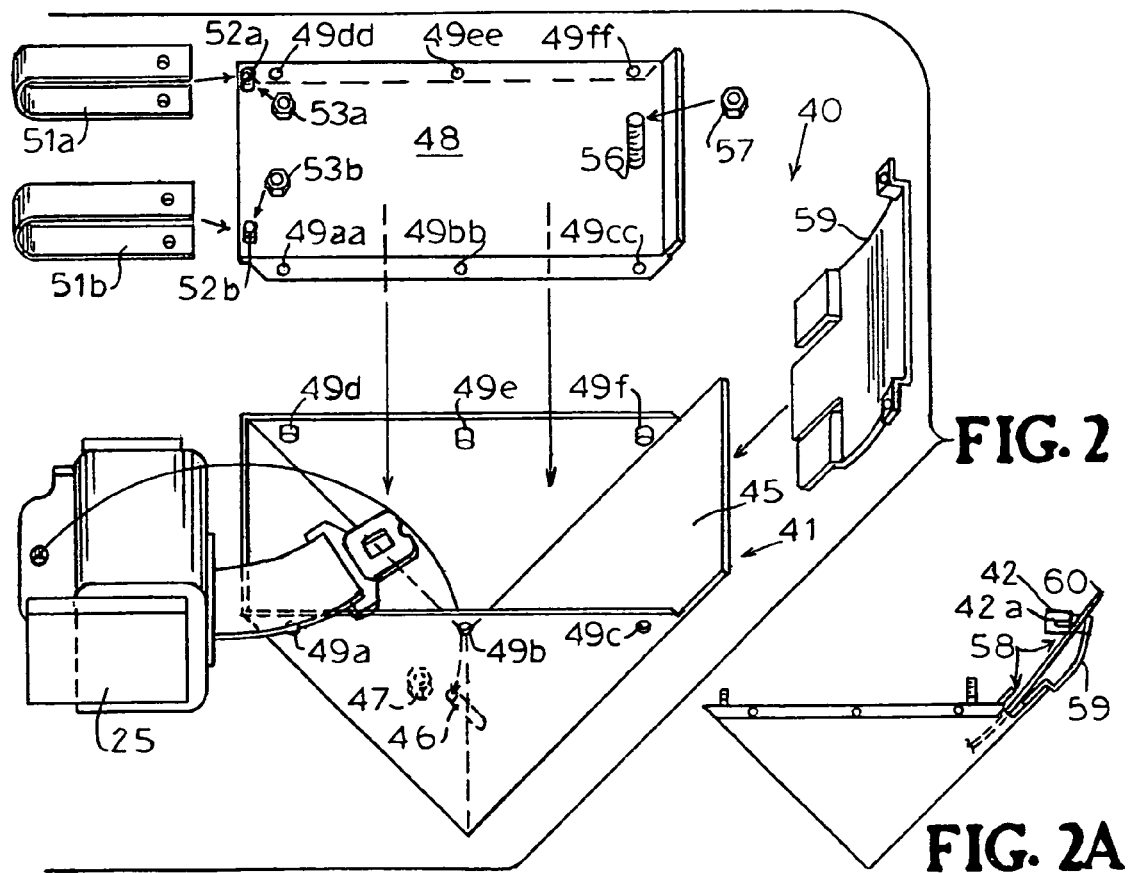
FIG. 2
FIG. 2A

SEAT BELT ASSEMBLY SYSTEM

SUMMARY OF THE INVENTION

Three-point seat belts may be retrofitted to a seat belt ready seat frame. In the specification that follows the following terminology will be utilized. The term "seat belt ready" means a seat frame, which without any substantial modification is adapted to be used with a seat belt assembly. The term "connector" as referred to at various times is intended to include commonly used connector components such as a tongue, a buckle, a clasp, or a post-type configuration. The term "Y-junction" will refer to the location at which the webbing connects to a junction, which splits off into two separate directions in the approximate direction of a Y. The term "retractor belt" will refer to the webbing and single connector which extends and retracts from a retractor over the shoulder and chest of an occupant. The term "single lap belt" will refer to the webbing and single connector, which extends across from one side of the lap of an occupant. The term "multi-connecting lap and shoulder belt" will refer to the webbing, Y-junction, and two connectors (or the embodiment wherein a tongue with a male post connector is incorporated therein in lieu of the Y-junction and two connectors) is located on an opposite side of the occupant, extending across the lap of the occupant and connected to both the retractor belt and to the single lap belt. The term "lap belt assembly" refers to the webbing and connectors at the junction of the single lap and multi-connecting lap and shoulder belt. One example of these terms is illustrated by the construction shown in FIG. 3.

A first embodiment of the invention permits a school bus seat belt ready seat frame to be retrofitted with a three-point seat belt. A retractor assembly is mounted inside a housing unit, which is then mounted to the underside of the seat frame. Mounting the housing unit to the underside of the seat frame may include the use of bolts, straps, and/or other means including welding the housing unit to the underside of the seat frame. The retractor assembly mounted inside the housing unit contains a retractor mechanism, as well as the retractor belt, which has mounted on its distal end a seat belt connector, which in the first embodiment is a tongue connector. The retractor belt which serves as a shoulder and chest protective belt extends out of the housing unit and is routed up and over the back of the seat frame, over the shoulder of the occupant and at its distal end is connected to a lap belt assembly. The retractor belt with its mounted connector is preferably routed through or over the seat back cushion. Channels (which are not shown) may be created in the seat back cushion to facilitate such routing of the seat belt. A single lap belt attached to the seat frame contains a buckle connector at its end. A multi-connecting lap and shoulder belt configuration is utilized containing what is in effect a Y-junction with two connectors. The first of the two connectors is a buckle, which releasably attaches to the tongue connector on the retractor belt. The second connector is a tongue connector, which connects to the belt connector on the single lap belt. The described first as well as all other embodiments of the invention may readily be adapted for use in other vehicles, including vans, trucks and cars, with both regular and bench-type seating as well as being adaptable for use as original equipment on new school buses. Alternative embodiments also include the use of the lap belt assembly alone without the use of the retractor belt to accommodate infant or child seats. Also included would be variations where the retractor belt connects to child restraint connectors. Also recognized is that the three-way connection used in the first as well as other embodiments of the invention and which serves to join the lap and shoulder belts may also be used separately of the illustrated retrofit housing.

A second embodiment of the invention provides a retrofit design for a school bus seat belt ready seat frame with multiple seat belt assemblies per bench seat. A retractor assembly in this second embodiment is mounted to the underside of the seat frame beneath the seating area for each occupant and the retractor belt for each occupant is routed similar to the routing for the first embodiment. Such embodiment can be employed for school bus bench seats seating multiple occupants including seats of 26 inches, 32 inches, 39 inches, 45 inches, and 90 inches as well as other size bench seats. Different configurations than as illustrated in FIG. 4 may include variations for left and right seating.

A third embodiment of the invention includes a clasp connector on the retractor belt. The two connectors on the multi-connecting lap and shoulder belt in this third embodiment are a tongue connector with a male post connector. The clasp connector on the retractor belt connects to the male post connector of the multi-connecting lap and shoulder belt. The single lap belt contains a buckle, which releasably attaches to the tongue connector of the lap and shoulder belt.

A fourth embodiment of the invention includes a tongue connector on the retractor belt and the multi-connecting lap and shoulder belt contains two buckles. The first buckle releasably attaches to the tongue of the retractor belt. The second buckle releasably attaches to a tongue connector attached to the distal end of the single lap belt.

Many variations are contemplated in addition to those described above. While the invention has been illustrated and described in detail in the drawings and foregoing description, the same is considered as illustrative and not restrictive in character, it being understood that only the preferred embodiments have been shown and described and that all changes and modifications that come within the spirit of the invention are desired to be protected.

BRIEF DESCRIPTION OF THE DRAWINGS

FIG. 2 is an exploded perspective view of the retractor and belt housing unit with the seat belt retractor.

FIG. 2A is a reduced side view of a portion of the assembled retractor and belt housing unit showing the aperture through which the retractor belt is extended and retracted.

FIG. 5 is a pictorial view of the third embodiment illustrating use of a clasp and post-type connector.

DETAILED DESCRIPTION

Figure 1:
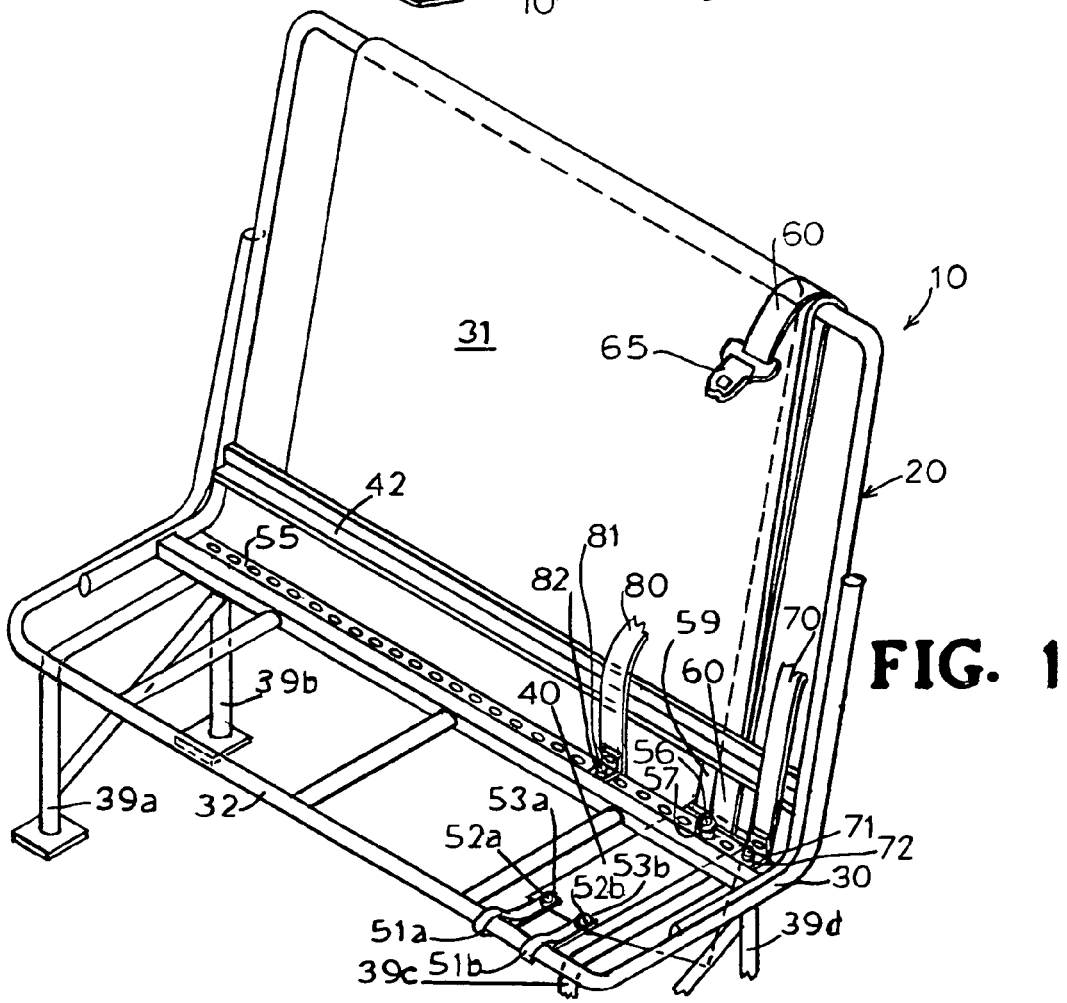
FIG. 1 is a perspective view of the first embodiment showing the seat belt ready seat frame, without the seat cushions, but showing the housing unit and belt attachments for a single occupant.

The first embodiment of the invention is shown in FIG. 1. Seat belt ready seat frame 10 is composed of back seat frame 20 and bottom seat frame 30. Metal sheet 31 is attached to back seat frame 20 and supports back cushion 11 shown in FIG. 3. The seat frame 10 is mounted onto the floor of a vehicle by mounting legs 39a, 39b, 39c and 39d. Alternative embodiments may include fewer legs as well as variations where the seat is mounted to the side of the vehicle. In this first embodiment, retractor and belt housing unit 40 is mounted to the underside of the seat frame 30 at the front bar portion 32 of bottom seat frame 30 by mounting straps 51a and 51b and by studs 52a and 52b and nuts 53a and 53b. The housing unit 40 is attached to the rear of the seat frame 10 at rear bar portion 55 by stud 56 and nut 57. In alternative embodiments of the invention, the housing unit may be attached solely to the rear of the seat frame by bolts and nuts or by other attachment means such as by welding the housing unit to the underside of bottom seat frame 30. Retractor belt 60 exits the aperture 58 (FIG. 2A) of the housing unit and back cover portion 59 and extends up and over the back of the back seat frame 20. Back cover portion 59 slideably attaches to enclosure portion 41 and secures to a wooden rail 42 located near the bottom of back seat frame 20, protecting the belt webbing from tampering by occupants in the immediately adjacent seats to the rear. Tongue connector 65 is connected at the distal end of webbing 60. Multi-connecting lap and shoulder belt 70 is attached to rear bar portion 55 by bolt 71 and nut 72. Single lap belt 80 is connected to rear bar portion 55 by bolt 81 and nut 82.

FIG. 2 is an exploded perspective view of retractor and belt housing unit 40. Housing unit 40 is composed of an enclosure portion 41 and a lid portion 48. Mounting straps 51a and 51b attach via studs 52a and 52b and nuts 53a and 53b, respectively. The straps are wrapped around front bar portion 32 of bottom seat frame 30 shown in FIG. 1. The conventional retractor mechanism is mounted inside a retractor housing 25, which is then mounted inside enclosure portion 41 onto stud 46 and fastened with nut 47. Lid portion 48 is attached to enclosure portion 41 by bolts screwed into openings 49a, 49b, 49c, 49d, 49e, and 49f in enclosure portion 41 and corresponding openings 49aa, 49bb, 49cc, 49dd, 49ee and 49ff in lid 48. Housing unit 40 is attached to rear bar portion 55 (see FIG. 1) by bolt 56 and nut 57. Back cover portion 59 slideably attaches to and mounts on the top portion 45 of enclosure portion 41 and is secured by screws 42a or other suitable means to wooden rail 42 located near the bottom of back seat frame 20. Alternative fastening means are also contemplated in addition to those described herein.

FIG. 2A is a reduced side view of the assembled retractor and belt housing unit 40 showing the aperture 58 through which the retractor belt 60 extends and retracts from the enclosure portion 41, lid portion 48 and back cover portion 59.

Figure 3:
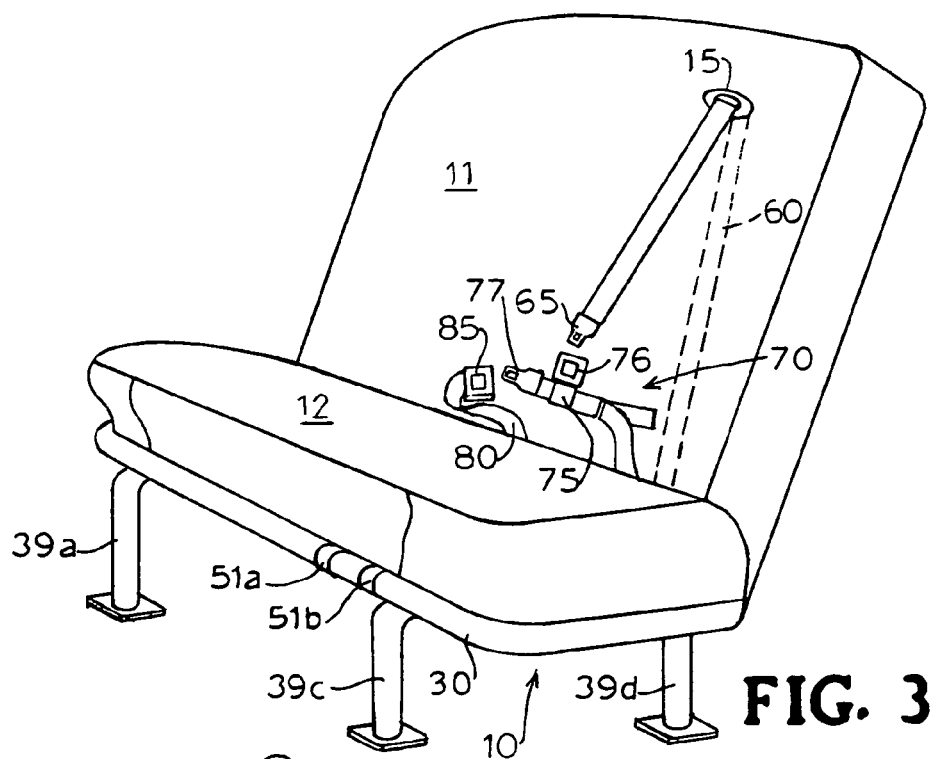
FIG. 3 is a pictorial view of the first embodiment of FIG. 1 with the seat and back cushions and deployment of seat belts.

FIG. 3 shows a pictorial view of the first embodiment of the invention. Seat belt ready seat frame 10 has seat back cushion 11 removably attached to back seat frame 20 (FIG. 1) and seat bottom cushion 12 removably attached to bottom seat frame 30. Seat frame 10 is mounted to the floor of the vehicle by mounting legs 39a, 39b, 39c, and 39d (FIG. 1). Retractor and belt housing unit 40 (FIG. 1) is mounted to frame 10 by mounting straps 51a and 51b. Retractor belt 60 extends from housing unit 40 up the back and over the top of back seat frame 20 or through a channel 15 in seat back cushion 11. Alternative embodiments include routing the retractor belt 60 over the top of the seat back cushion or utilizing molded cushions that permit routing of the webbing through the cushion. Retractor belt 60 has at its distal end a tongue connector 65. Multi-connecting lap and shoulder belt 70 is connected to the seat frame and at its distal end has a Y-junction 75 with a buckle connector 76, which releasably attaches to tongue connector 65. Y-junction 75 also has a tongue connector 77. Single lap belt 80 is connected to rear bar portion 55 and at its distal end to buckle connector 85, which releasably attaches to tongue connector 77. Multi-connecting lap and shoulder belt 70 has the ability to adjust its length to fit various size occupants. Alternative embodiments would permit adjustment of the length of the single lap belt 80, rather than by adjusting the length of belt 70.

Figure 4:
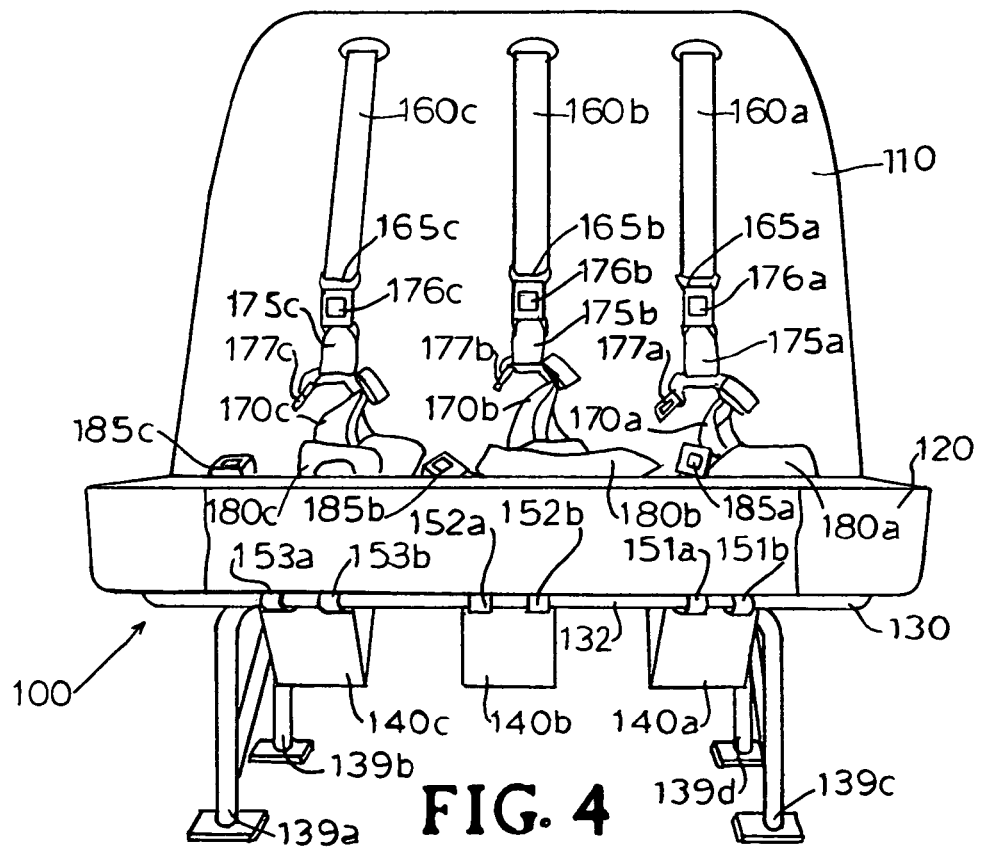
FIG. 4 is a pictorial view of the second embodiment with three retractor and belt housing units, three multi-connecting lap and shoulder belts, and three single lap belts for three occupants.

FIG. 4 shows a pictorial view of a second embodiment of the invention. In this embodiment multiple seat belt systems are employed on a single seat belt ready seat frame 100 with a seat back cushion 110, seat bottom cushion 120 and bottom seat frame 130.

FIG. 5 shows a pictorial view of a third embodiment of the invention. Seat belt ready seat frame 10 has seat back cushion 11 removably attached to back seat frame 20 and seat bottom cushion 12 removably attached to bottom seat frame 30. Seat frame 10 is mounted to the floor of the vehicle by mounting legs 39a, 39b, 39c and 39d. Retractor and belt housing unit 40 is mounted to frame 10 by mounting straps 51a and 51b. Retractor belt 60 extends from housing unit 40 up the back and around the top of back seat frame 20 and through a channel 15 in seat back cushion 11. Alternative embodiments include routing the retractor belt 60 over the top of the seat back cushion or utilizing molded cushions that permit routing of the retractor belt through the cushion. Retractor belt 60 connects at its distal end to clasp connector 66. Multi-connecting lap and shoulder belt 270 is connected to the seat frame and at its distal end has a tongue connector 265 with a male post connector 275 located at its front side. Clasp connector 66 releasably attaches to male post connector 275. Single lap belt 80 is connected to rear bar portion 55 and at its distal end to buckle connector 85, which releasably attaches to tongue connector 265. Multi-connecting lap and shoulder belt 270 has the ability to adjust its length to fit various size occupants. Alternative embodiments would permit adjustment of the length of the single lap belt 80, rather than by adjusting the length on belt 270.

Figure 6:
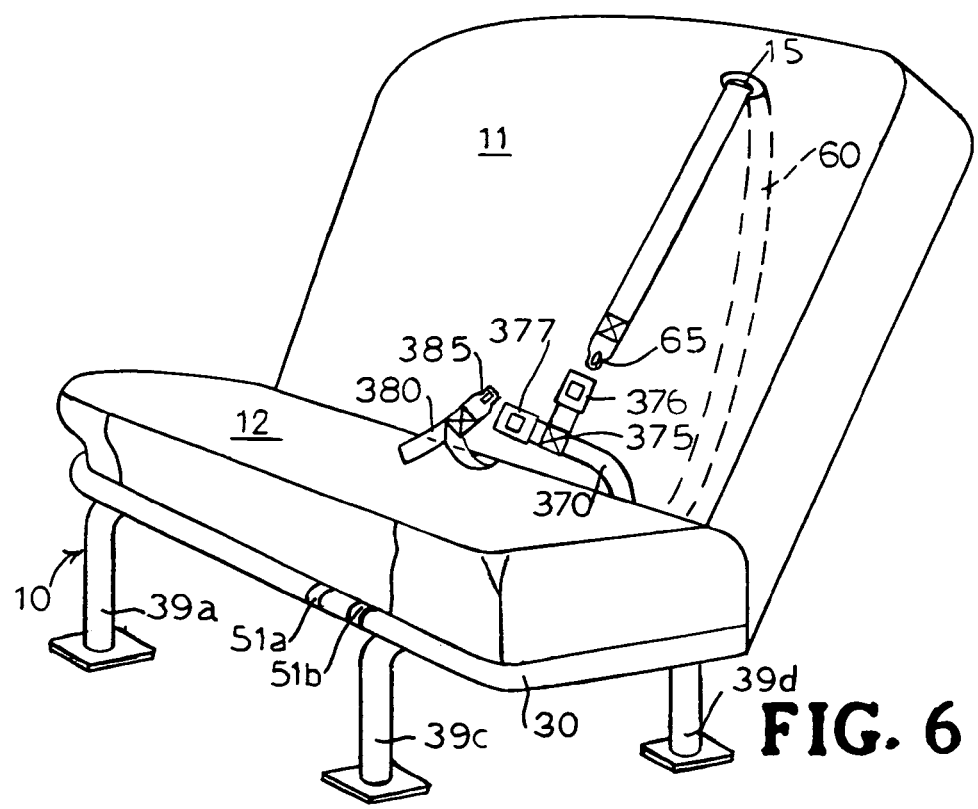
FIG. 6 is a pictorial view of the fourth embodiment illustrating use of a multi connecting lap and shoulder belt with a two-buckle arrangement.

FIG. 6 shows a pictorial view of a fourth embodiment of the invention. Seat belt ready seat frame 10 has seat back cushion 11 removably attached to back seat frame 20 and seat bottom cushion 12 removably attached to bottom seat frame 30. Seat frame 10 is mounted to the floor of the vehicle by mounting legs 39a, 39b, 39c and 39d. Retractor and belt housing unit 40 is mounted to frame 10 by mounting straps 51a and 51b. Retractor belt 60 extends from housing unit 40 up the back and around the top of back seat frame 20 and through a channel 15 in seat back cushion 11. Alternative embodiments include routing the retractor belt 60 over the top of the seat back cushion or utilizing molded cushions that permit routing of the webbing through the cushion. Retractor belt 60 has at its distal end tongue connector 65. Multi-connecting lap and shoulder belt 370 is connected to the seat frame and at its distal end has a Y-junction 375 with a buckle connector 376, which releasably attaches to tongue connector 65. Y-junction 375 also has a second buckle connector 377. Single lap belt 380 is connected to rear bar portion 55 and at its distal end to tongue connector 385, which releasably attaches to buckle 377. Single lap belt 380 has the ability to adjust its length to fit various size occupants. Alternative embodiments would include having the adjustment of the length of the multi-connecting lap belt 370 rather than by adjusting the length on belt 380.

I claim:

1. A seat belt system adapted for use with a seat having a seat-belt ready seat frame of a type having a substantially vertical, rectangular back seat frame formed by rigidly joined top, side, and bottom bar portions, a substantially horizontal, rectangular bottom seat frame formed by rigidly joined front, rear, and side bar portions and joined to said back seat frame, a seat back cushion removably attached to said back seat frame and a seat bottom cushion removably attached to said bottom seat frame, without further modification to said seat frame; said seat belt system comprising:
 a) a retractor and belt housing unit comprising:
  i) an enclosure portion;
  ii) a lid portion fixedly attached to said enclosure portion;
  iii) a seat belt retractor contained within said enclosure and lid portions and fixedly attached to said enclosure portion comprising:
   1) a seat belt retractor mechanism; and
   2) a retractor shoulder belt bounded by front and back sides mounted on said seat belt retractor mechanism and having at a distal end thereof a first seat belt connector;
  iv) a back cover portion, adapted at one end to be fixedly attached to said seat belt ready seat frame and at an opposite end to be removably attached to said retractor and belt housing unit and covering said back side of said retractor shoulder belt extending from said retractor and belt housing unit; said back cover portion in conjunction with said enclosure and lid portions forming an aperture for passage of said retractor shoulder belt such that said aperture permits said retractor shoulder belt to be withdrawn and retracted by use of said seat belt retractor mechanism through said aperture; and
  v) means enabling said retractor and belt housing unit to be adapted such that it can be fixedly attached to the underside of said seat belt ready seat frame;
 b) a multi-connecting lap and shoulder belt adapted to be fixedly attached at one end to said seat belt ready seat frame, and connected at a distal end by means of a Y-junction configuration to second and third seat belt connectors, wherein said second connector releasably interconnects with said first connector; and
 c) a single lap belt adapted to be fixedly attached at one end to said seat frame and connected at the opposite distal end to a fourth seat belt connector releasably interconnected with said third connector.

2. The seat belt system of claim 1, wherein said means for fixedly attaching said retractor and belt housing unit can be adapted to be fixedly attached to the underside of said seat belt ready seat frame comprises bolts for bolting said retractor and belt housing unit to said seat belt ready seat frame at one end and straps for strapping said retractor and belt housing unit to said seat belt ready seat frame at an opposite end.

3. The seat belt system of claim 1, wherein said retractor and belt housing unit is adapted to be secured below, and adapted to extend between said front and rear bar portions of said bottom seat frame of a seat belt ready seat frame.

4. The seat belt system of claim 3, wherein said retractor and belt housing unit is adapted to be secured by a bolt to the underside of said rear bar portion of said bottom seat frame of a seat belt ready seat frame and by straps to the front bar portions of said bottom seat frame.

5. The seat belt system in claim 1, wherein the path of said retractor belt includes an opening through said seat back cushion.

6. The seat belt system of claim 1, wherein said first connector is a tongue connector.

7. The seat belt system of claim 6, wherein said second and third connectors comprise buckles and said fourth connector comprises a tongue connector.

8. The seat belt system of claim 6, wherein said second section of seat belt webbing has means for adjusting the length of said second section of webbing, said second connector comprises a buckle, and said third connector comprises a tongue connector.

9. The seat belt system of claim 8, wherein said fourth connector comprises a buckle.

10. The seat belt system of claim 1, wherein said first connector is a clasp connector.

11. The seat belt system of claim 10, wherein said multi-connecting lap and shoulder belt includes means for adjusting the length of said belt, said second connector comprises a post connector, and said third connector comprises a tongue connector.

12. The seat belt system of claim 11, wherein said fourth connector comprises a buckle.

13. The seat belt system of claim 1, wherein said fourth connector comprises a tongue connector, and said single lap belt comprises means for adjusting the length of said lap belt.

14. The seat belt system of claim 1, wherein said retractor and belt housing unit comprises:
 a) a three dimensional triangular bottom portion comprising;
  i) a rectangular sheet of metal, with top and bottom sides and two lateral sides, bent at about a ninety degree angle wherein the bend is perpendicular to the two lateral sides and divides the length into top and bottom portions, both portions with a top half and a bottom half, and wherein an opening for a stud is provided for at the bottom half of the top portion;
  ii) a first triangular sheet of metal attached at approximately a ninety degree angle to the first lateral side of said rectangular sheet at both the top and bottom portions, and wherein a plurality of openings are provided for at the distal end opposite the attachment to said first triangular sheet; and
  iii) a second triangular sheet of metal attached at approximately a ninety degree angle to the second lateral side of the rectangular sheet at both the top and bottom portions, and wherein a plurality of openings are provided for at the distal end opposite the attachment to said second triangular sheet;
 b) a second rectangular sheet of metal, with top and bottom ends and two lateral sides, having an extension at the top end upwardly bent at approximately a forty-five degree angle, and having both lateral sides bent downwards at about a ninety degree angle, and tapered inward at both top and bottom ends such that said second rectangular sheet fits over top of and encloses said three-dimensional triangular bottom portion, and wherein both bent lateral sides contain a plurality of openings for fixedly attaching said second rectangular sheet to said three-dimensional bottom portion; and
 c) said seat belt retractor mechanism mounted within said housing unit.

15. The retractor and belt housing unit of claim 14, wherein said metal sheets are composed of steel.

16. The seat belt system of claim 1, adapted for use at any one of a plurality of locations on a seat belt ready seat frame of a width designed to accommodate a plurality of occupants, each of whom is provided with one of a plurality of said seat belt systems.

17. The seat belt system of claim 1 wherein said aperture is formed in a manner to prevent tampering with said retractor shoulder belt by an occupant seated behind the user of said seat belt system.

18. A seat belt system adapted for use with a seat structure having: (i) a substantially vertical, rectangular back frame formed by rigidly joined top, side, and bottom bar portions; (ii) a substantially horizontal, rectangular bottom seat frame formed by front, rear, and side bar portions; (iii) a back cushion covering and secured to said back frame; and (iv) a bottom cushion covering and secured to said bottom seat frame;

said seat belt system comprising:
 a) a seat belt and belt retracting storage container having:
  (i) a base adapted to be secured to selected bar portions of said bottom seat frame; and (ii) a wall structure joined to said base, forming said container and extending downwardly below said base;
 b) a belt retracting mechanism stored in said container and mounting an extendable length of shoulder belt having a chest portion which can be withdrawn and retracted by use of said mechanism, said shoulder belt being arranged to pass through and be guided by: (i) a lower aperture surrounded by portions of said base and wall structure, portions of said structure being adapted to be located rearwardly of said bottom seat frame rear bar portion; and (ii) an upper channel adapted to be formed in and passing through an upper portion of said back cushion;
 c) a shoulder belt connector mounted on a distal end of said shoulder belt;
 d) a lap belt made up of first and second sections, at least one section of which is extendable and wherein: (i) said first section is adapted to being secured at one end to said bottom seat frame and at an opposite distal end having a lap-shoulder belt multi-connector mounted thereon comprised of a first and second connector; and (ii) said second section is adapted to being secured at one end to said bottom seat frame at a location inwardly of where said first section is adapted to being secured and at an opposite distal end mounting a lap belt connector thereon, said lap belt connector designed to be able to be releasably joined with said first connector;
 e) said second connector designed to be releasably connected to said shoulder belt connector; and
 f) wherein said seat structure, back, and bottom seat frames are adapted for immediate use with said seat belt system.

19. A seat belt system, as claimed in claim 18, wherein said shoulder belt connector is a clasp connector, and said first connector is a tongue connector and said second connector is a male post connector located on the front side of said tongue connector.

20. A seat belt system, as claimed in claim 18, including a belt guide plate mounted on a trailing portion of said container wall structure.

21. A seat belt system, as claimed in claim 18, wherein said belt retracting mechanism includes a retractor housing secured to said container wall structure.

22. The seat belt system, as claimed in claim 18, adapted for use at any one of a plurality of locations with a seat structure of a width designed to accommodate a plurality of occupants, each of whom is provided with one of a plurality of said seat belt systems.

23. A seat belt system adapted for use with a seat structure having: (i) a substantially vertical, rectangular back frame formed by rigidly joined top, side, and bottom bar portions; (ii) a substantially horizontal, rectangular bottom seat frame formed by front, rear, and side bar portions; (iii) a back cushion covering and secured to said back frame; and (iv) a bottom cushion covering and secured to said bottom seat frame;

said seat belt system comprising:
 a) a seat belt and belt retracting storage container having:
  (i) a base adapted to be secured to, below, and extending between said front and rear bar portions of said bottom seat frame; and (ii) a wall structure joined to said base, forming said container and extending downwardly below said base;
 b) a belt retracting mechanism stored in said container and mounting an extendable length of shoulder belt having a chest portion which can be withdrawn and retracted by use of said mechanism, said shoulder belt being arranged to pass through and be guided by: (i) a lower aperture surrounded by portions of said container base and wall structure and having selected portions of said structure adapted to be located rearwardly of said bottom seat frame rear bar portion; and (ii) by an upper channel adapted to be formed in and passing through an upper portion of said back cushion;
 c) a shoulder belt male connector mounted on a distal end of said shoulder belt;
 d) a lap belt made up of first and second sections, at least one of which is extendable: (i) said first section adapted for being secured at one end to said bottom seat frame and at an opposite distal end having a lap belt male connector mounted thereon; and (ii) said second section adapted for being secured at one end to said bottom seat frame at a location inwardly of where said first section is secured and at an opposite distal end mounting another lap belt female connector thereon, said lap belt connectors being formed such that by interconnection of said lap belt male connector to said lap belt female connector, said first and second sections are enabled to be releasably joined;
 e) a lap-shoulder belt female connector mounted on and intermediate the length of said lap belt first section, whereby, by interconnection of said shoulder belt male connector and said lap-shoulder belt female connector, said distal end of said shoulder belt is enabled to be releasably joined to an intermediate portion of said lap belt; and
 f) wherein said seat structure, back, and bottom seat frames are adapted for immediate use with said seat belt system.

24. The seat belt system, as claimed in claim 23, adapted for use at any one of a plurality of locations on a seat structure of a width designed to accommodate a plurality of occupants, each of whom is provided with one of a plurality of said seat-belt systems.

25. A three-point seat belt system adapted for use with a seat frame having a seat back with a front and back side and a seat bottom with a topside and an underside, wherein said system comprises:
 a) a retractor shoulder belt with a single first connector on its distal end and being adapted at its opposite end to be fixedly attached to the underside of said seat bottom and extending to the front side of said seat back; and b) a multi-connecting lap and shoulder belt comprising:
  i) seat belt webbing connected in a Y-junction and adapted to be fixedly attached at one end to said seat frame and with second and third connectors attached at the other ends;
  ii) said second connector attached to said webbing at one end of the Y-junction releasably attaches to said first connector; and
  iii) said third connector attached to the second end of the Y-junction releasably attaches to a fourth connector located at the distal end of a single lap belt which is adapted to be fixedly attached at the other end to said seat frame.

26. The seat belt system of claim 25, wherein said first connector is a clasp connector, said second connector is a post connector, said third connector is a tongue connector, and said fourth connector is a buckle.

27. The seat belt system of claim 25, wherein said first and fourth connectors are tongue connectors, and said third and fourth connectors are buckles.

28. The seat belt system of claim 25 wherein said retractor shoulder belt is adapted to pass through an opening in said seat back passing from the back side to the front side of said seat back.

29. The seat belt system of claim 25, wherein said first and third connectors are tongue connectors, and said second and fourth connectors are buckles.

30. A method of establishing a ready-to-use seat belt system for use with a seat-belt ready seat frame made up of a substantially vertical, rectangular back seat frame formed by rigidly joined top, side, and bottom bar portions, a substantially horizontal rectangular bottom seat frame formed by rigidly joined front, rear, and side bar portions and joined to said back seat frame, a seat back cushion supported by said back seat frame and adapted for having a channel formed in an upper portion thereof, and a seat bottom cushion supported on said bottom seat frame, comprising the steps of:
  a) forming a ready-to-use seat belt assembly comprising:
    (i) a first section of lap belt having one end adapted for being secured to said bottom seat frame and terminating at a distal end thereof with a first connector;
    (ii) a second section of lap belt having one end adapted for being secured to said bottom seat frame and an opposite distal end terminating in a Y-junction with two ends with a second and third connector at the distal end of each end of said Y-junction;
    (iii) wherein at least one or both of said sections of lap belt are of adjustable length; and
    (iv) wherein said first connector releasably attaches to said second connector; and
  b) providing a shoulder belt retractor mechanism adapted for being secured to said bottom seat frame, for being mounted below said seat back cushion and for providing when drawn from said mechanism a section of shoulder belt terminating at a distal end thereof with a fourth connector, said section of shoulder belt having an intermediate portion adapted when elevated for being passed and slidable through said channel in operative association with said seat back cushion; and
  c) wherein said fourth connector releasably attaches to said third connector.

31. A ready-to-use seat belt system adapted for use with a seat-belt ready seat frame made up of a substantially vertical, rectangular back seat frame formed by rigidly joined top, side, and bottom bar portions, a substantially horizontal rectangular bottom seat frame formed by rigidly joined front, rear, and side bar portions and joined to said back seat frame, a seat back cushion supported on said back seat frame and adapted for having a channel formed in an upper portion thereof and a seat bottom cushion supported on said bottom seat frame, said ready to use seat belt system comprising:
  a) a lap belt assembly having:
    i) a first section of lap belt having one end adapted for being secured to said bottom seat frame and terminating at a distal end thereof with a first connector;
    ii) a second section of lap belt having one end adapted for being secured to said bottom seat frame and an opposite distal end terminating in a Y-junction with a second and third connector at the distal end of each end of said Y-junction;
    iii) wherein at least one or both of said sections of lap belt are of adjustable length; and
    iv) wherein said first connector releasably attaches to said second connector;
  b) a shoulder belt retractor mechanism adapted for being secured to said bottom seat frame, for being mounted below said seat back cushion and for providing when drawn from said mechanism a section of shoulder belt terminating at a distal end thereof with a fourth connector, said section of shoulder belt having an intermediate portion adapted when elevated for being passed and slidable through said channel in operative association with said seat back cushion; and
  c) wherein said fourth connector releasably attaches to said third connector.

* * * * *